United States Patent [19]

Stier

[11] Patent Number: 4,806,062

[45] Date of Patent: Feb. 21, 1989

[54] STOWABLE LIFT FOR FREIGHT VEHICLES

[75] Inventor: Herbert A. Stier, Arcadia, Calif.

[73] Assignee: Maxon Industries, Inc., Huntington Park, Calif.

[21] Appl. No.: 114,015

[22] Filed: Oct. 29, 1987

[51] Int. Cl.$^4$ .............................................. B60P 1/46
[52] U.S. Cl. .................... 414/545; 187/9 R; 292/126
[58] Field of Search .............. 414/540, 545, 557; 187/9 R; 292/31, 123, 126, 128, DIG. 32; 296/57 R

[56] References Cited

U.S. PATENT DOCUMENTS

| | | | |
|---|---|---|---|
| 1,552,132 | 9/1925 | Frasch | 292/128 X |
| 2,706,565 | 4/1955 | Krasno | 187/9 R |
| 3,734,239 | 5/1973 | Martin et al. | 414/545 X |
| 3,795,329 | 3/1974 | Martin et al. | 414/545 |
| 3,968,890 | 7/1976 | Robson | 414/545 X |
| 4,007,844 | 2/1977 | Perkins | 414/545 X |

FOREIGN PATENT DOCUMENTS

| | | | |
|---|---|---|---|
| 3123546 | 1/1983 | Fed. Rep. of Germany | 187/9 R |
| 128935 | 8/1983 | Japan | 414/545 |
| 1266769 | 10/1986 | U.S.S.R. | 414/545 |
| 2174972 | 11/1986 | United Kingdom | 414/545 |

*Primary Examiner*—Frank E. Werner
*Assistant Examiner*—David A. Bucci
*Attorney, Agent, or Firm*—Frederick E. Mueller

[57] ABSTRACT

A forward platform section is hingedly connected at its forward edge to lower ends of a pair of runner assemblies that are vertically movably mounted in guides of a supporting framework. A closed rear edge of the forward platform section is hingedly interconnected to a closed forward edge of a rear platform section, the hinge connection being adapted for folding an underside of the rear platform section into superposition over an underside of the forward platform section. The curb side runner assembly incorporates a power cylinder for rotating the forward platform section between vertical and horizontal positions. A known linkage effects rotation of the rear platform section between vertical and horizontal positions as a function of corresponding rotation of the forward platform section. A pair of stoppers on opposite sides of the forward platform section are aligned with a pair of stirrups on opposite sides of the framework, the stirrups being upwardly and rearwardly open so that the stoppers can be rotated into and out of seating contact with the stirrups by rotation of the forward platform section without vertical movement of the runner assemblies. A latch on the framework maintains the stoppers in seated position on a stirrups. The framework includes the horizontal bed plate in vertically spaced apart relationship to the stirrups such that when the pair of platform sections are in collapsed condition the closed edges of the two platform sections define a flush continuation of the bed plate.

13 Claims, 4 Drawing Sheets

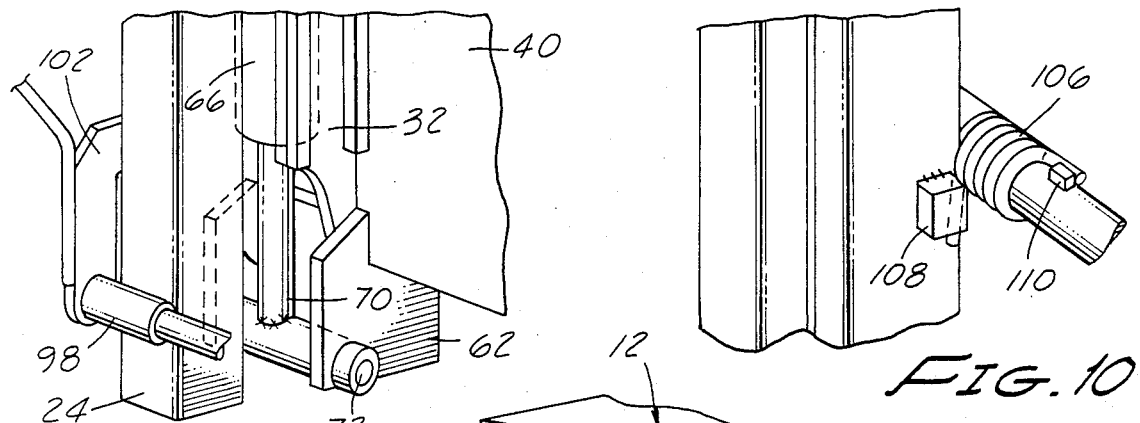
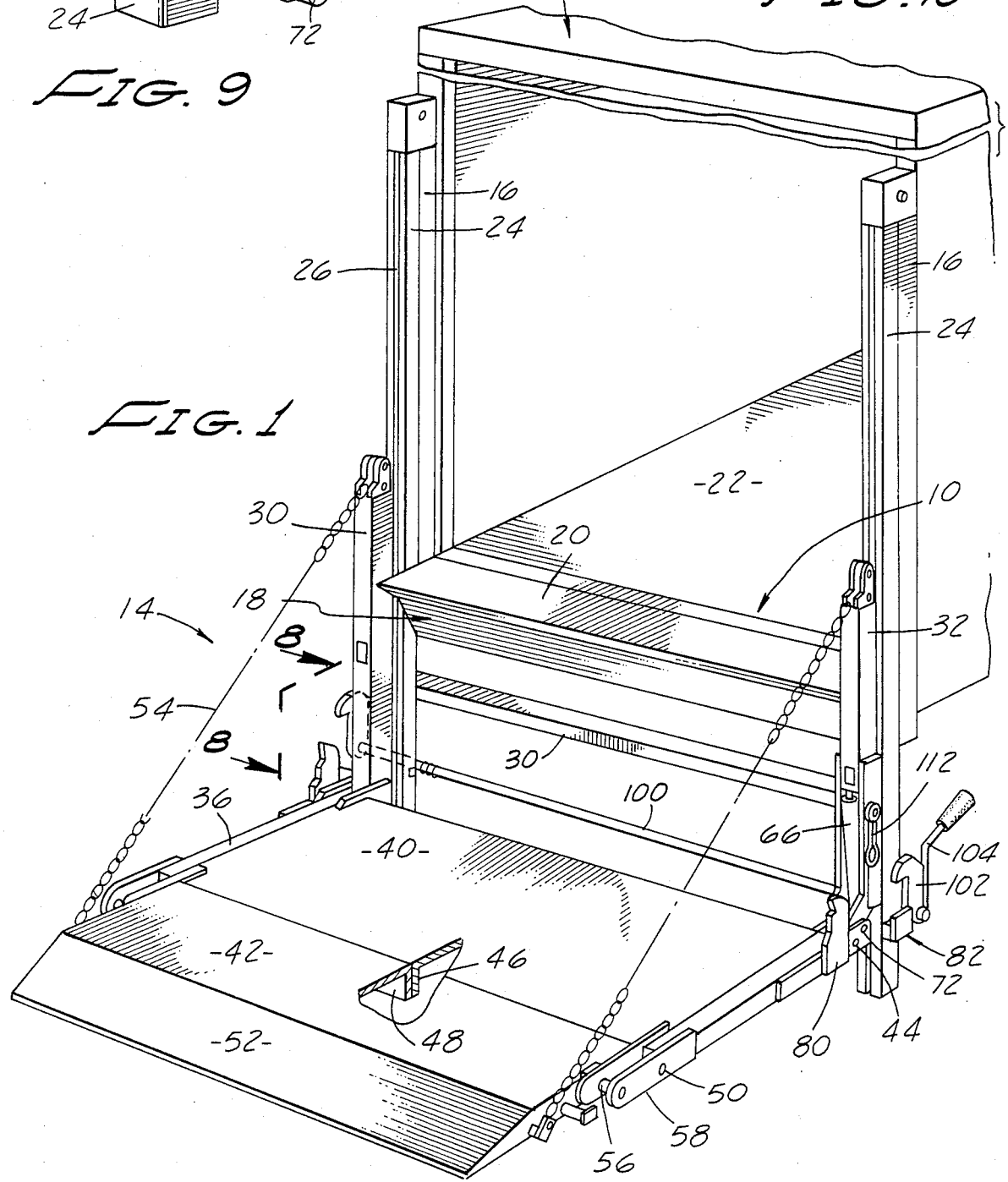

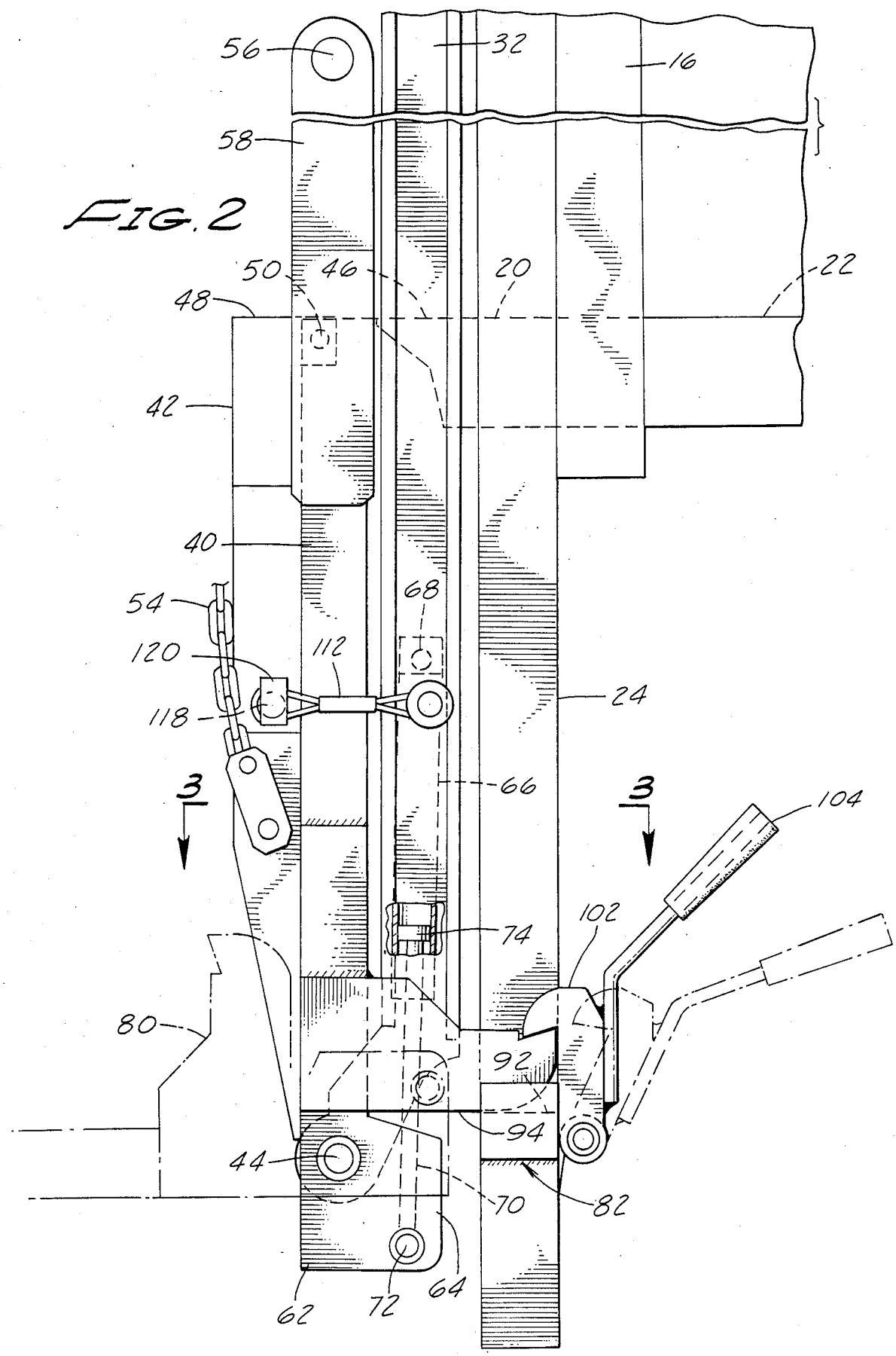

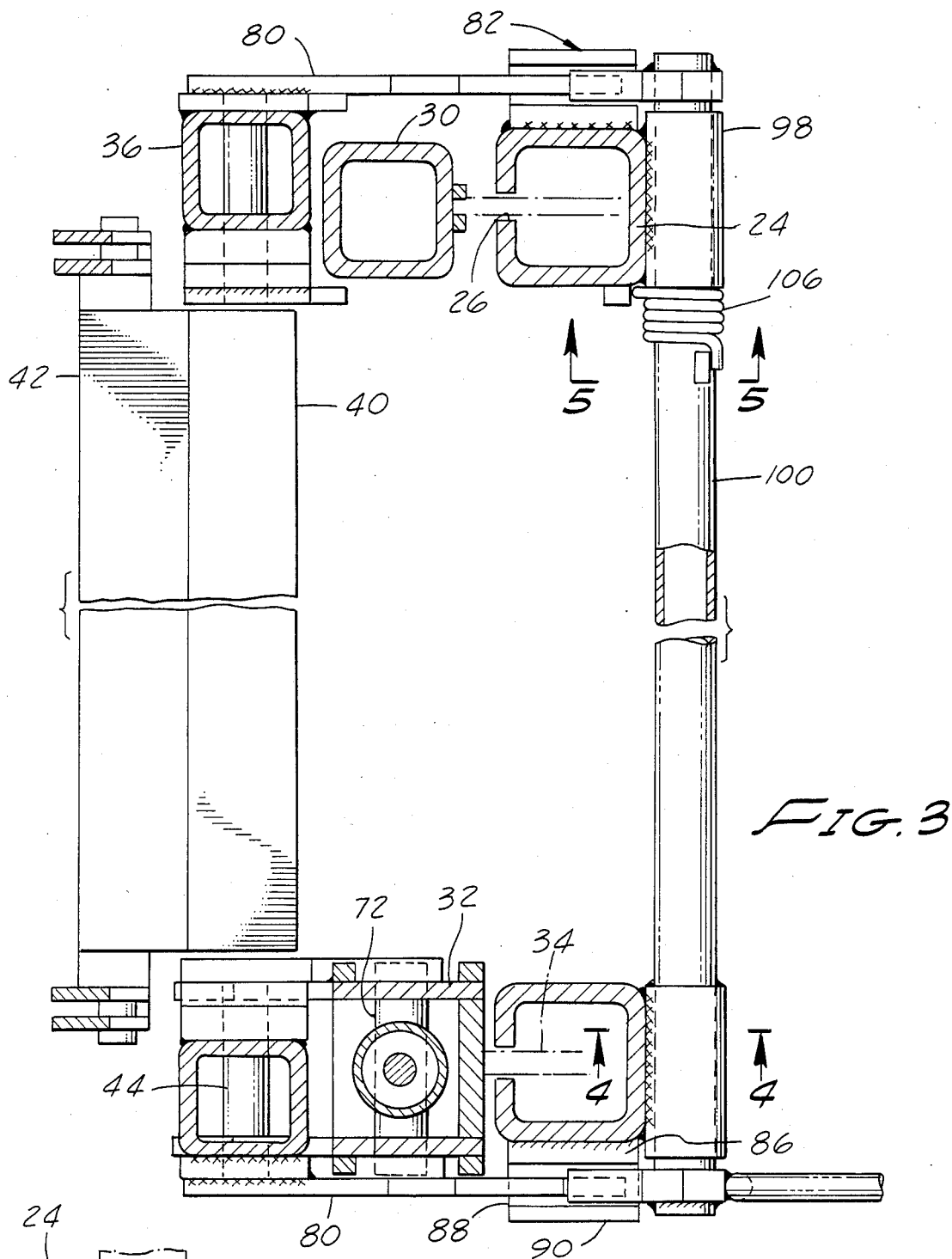
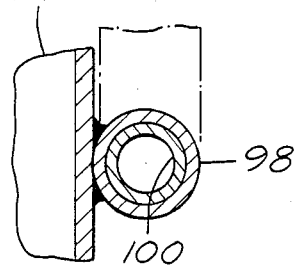
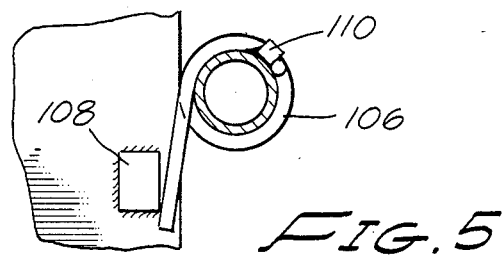
FIG. 3
FIG. 4
FIG. 5

STOWABLE LIFT FOR FREIGHT VEHICLES

BACKGROUND OF THE INVENTION

The present invention relates to a load elevator and, more particularly, to a truck lift that is stowable in an out-of-the-way position when not in use as a load elevator.

A truck lift (commonly referred to as a lift gate), typically comprises a load platform connected to a hydraulically powered mechanism for raising and lowering the platform between ground level and the bed of the truck. In the so-called conventional lift gate, the platform is pivotally connected to the raising and lowering mechanism and, in the transit position, occupies a vertically disposed and elevated position closing the tailgate opening of the truck bed. Thus, when a driver wishes to back up to a loading dock for purposes of loading directly onto the truck bed, he must first get out of the vehicle and operate the conventional lift gate in a mode to move the platform out of the tailgate position. This disadvantage is inherent in conventional lift gates, whether of the type in which the powered mechanism for raising and lowering the platform comprises a parallelogram linkage system or a pair of runner assemblies that are vertically reciprocable with respect to guide channels or rails.

In the case of conventional lift gates mounted on parallelogram linkage systems, the foregoing disadvantage has been overcome by the so-called fold-under lift gate wherein the load platform is invertible with respect to the lifting linkages and thus can be raised to an out-of-the-way position beneath the bed of the truck. However, a disadvantage remains in the foldunder lift gate in that the platform, whether of one piece or two piece construction, is relatively heavy and only manually movable into and out of the inverted position. In the case of the rail type conventional lift gate, the disadvantage of manual manipulation of the platform is eliminated in that the platform can be gravitationally lowered to a dockloading position while remaining vertically disposed but, nevertheless, the driver must still leave the cab of the vehicle in order to accomplish the lowering to the dockloading position.

U.S. Pat. No. 3,795,329 discloses a rail-type lift gate having a foldable two piece platform which is locked in the folded configuration in a transit and dockloading position, i.e., such that the upper edges of the two platform sections do not protrude above the level of the floor or bed of the vehicle. In this device the frame of the lift gate includes a pair of opposite side rearwardly projecting brackets or flanges formed with upwardly directed slots adapted to receive latch pins on opposite sides of the outer platform section. However, the two piece platform must be manually restrained into the collapsed condition during vertical movement of the collapsed platform and its latch pins into and out of the slots of the brackets or flanges of the framework of the device. Once the platform sections are lowered into place, the platform cannot be directly unfolded out of the collapsed condition but must first be elevated to lift the latch pins out of the slots. Furthermore, the construction is of a type such that when the platform in the dockloading position it does not provide an upper surface that is substantially continuous and flush with the bed of the vehicle.

SUMMARY OF THE INVENTION

The foregoing and other disadvantages of the prior art devices are solved by the present invention.

In this invention, a supporting framework includes a laterally spaced apart vertically disposed pair of guide channels vertically movably mounting a vertically elongate pair of runner assemblies. At their lower ends, the pair of runner assemblies pivotally mount the forward edge of a forward platform section whose rear edge is hingedly interconnected to the forward edge of a rear or outer platform section. A pair of flexible members, such as chains, cables, links or the like, are mounted on opposite sides of the assembly, each extending between a point of connection to the upper end of one of the runner assemblies and a point of connection at the rear end of the rear platform section on the corresponding side. One of the runner assemblies at its lower end pivotally mounts a hydraulic cylinder having a pivotal connection to a forward crank arm extension of the forward platform section, such that actuation of the cylinder effects rotation of the forward platform section between vertically and horizontally extending positions with consequent rotation of the outer platform section into an coplanar alignment with the forward platform section. The two platform sections are inter connected by a horizontal hinge means positioned for folding an underside of the rear platform section into superposition over an underside of the forward or inner platform section.

The forward platform section at each of its opposite sides is rigidly fitted with a stop member or stopper means that projects beyond the load bearing surface of the platform section. Each of these stop members is located rearwardly adjacent to the pivot axis of the forward platform section and in alignment with an upwardly and rearwardly open stirrup or saddle affixed to the outside of one of the opposite side guide members of the lift. A pair of hooks are pivotally mounted on the guide members adjacent to the stirrups, the pair of hooks being secured to opposite ends of a shaft that is torsionally biased to normally position the pair of hooks in interfering alignment with the stop members.

Each stop member and its corresponding hook are formed with complementary engaging surfaces and these two elements are so related relative to the pivot axis of the forward platform section that the collapsed platforms are maintained in the locked position independently of any loss of pressure in the hydraulic cylinder for rotating the platform. Conversely, should any failure occur in the contacting parts of either or both pairs of stop member and hook, the platform is maintained in the collapsed position by hydraulic pressure within the hydraulic cylinder. Each stop member and its corresponding hook have complementary cam surfaces such that upon lowering of the collapsed platform into the saddles, each hook is displaced to permit subsequent latching engagement between each hook and its corresponding stop member. When the pair of platform sections are in the collapsed transit position with their weight being borne by the stirrups the upper exposed edges of the platform sections define a horizontal surface that is flush and substantially continuous with the bed plate upper surface of a box frame member connected between the guide columns and framework of the lift gate and flush with the floor of the vehicle.

DESCRIPTION OF THE DRAWINGS

FIG. 1 is a perspective view of a lift gate incorporating the present invention, illustrating the platform in horizontally extending load bearing position.

FIG. 2 is a right side elevational view of the lift gate of FIG. 1 showing the lift gate in a collapsed transit and dock loading position.

FIG. 3 is a sectional view on the line 3—3 of FIG. 2.

FIG. 4 is a sectional view on the line 4—4 of FIG. 3.

FIG. 5 is a sectional view on the line 5—5 of FIG. 3.

FIG. 9 is a fragmentary perspective view taken from the forward side of the curb side or right hand side.

FIG. 10 is a fragmentary perspective view of a lower end portion of the left side guide column.

DESCRIPTION OF THE PREFERRED EMBODIMENT

Figure 6:
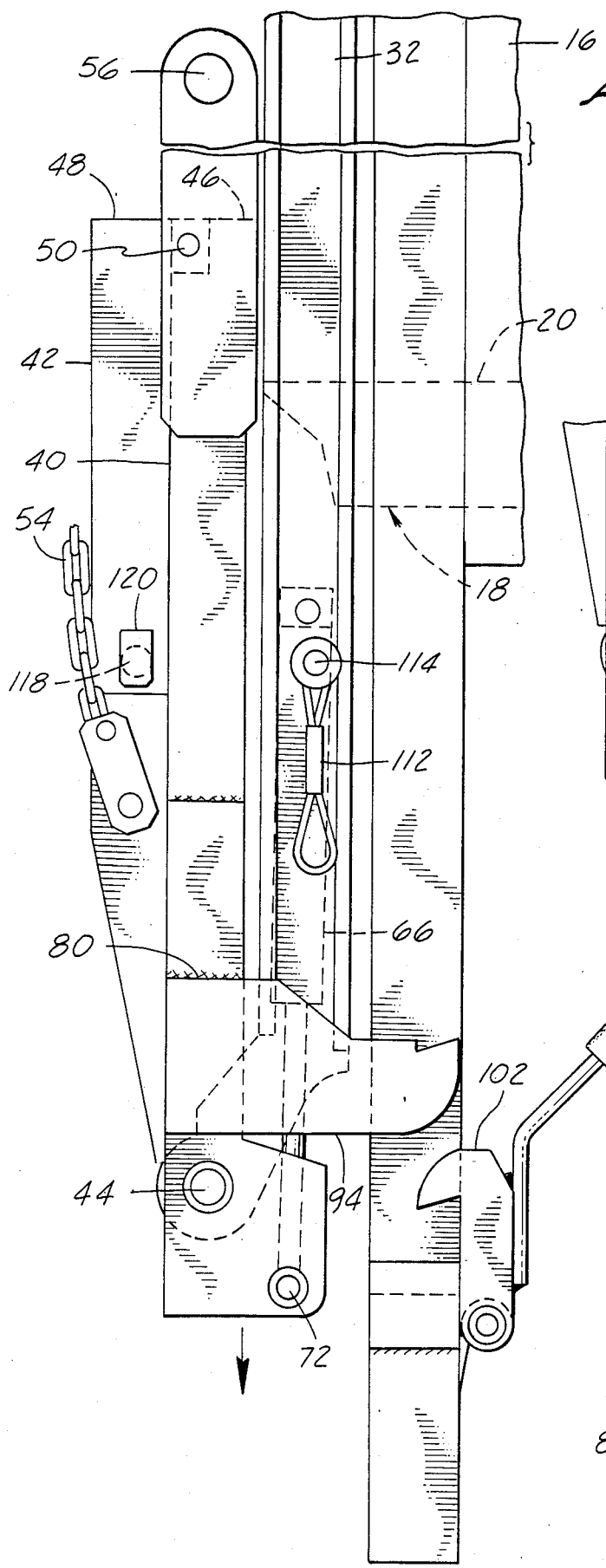
FIG. 6 is a right side elevational view like that of FIG. 2, but showing the folded platform in a descending mode.
Figure 7:
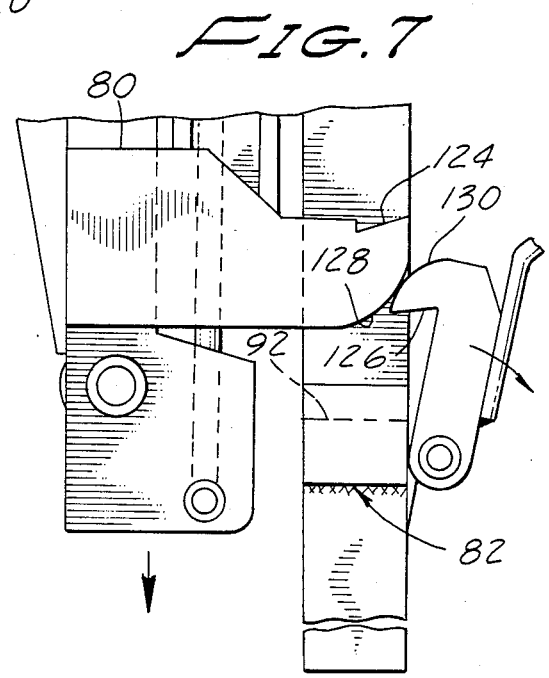
FIG. 7 is a fragmentary elevational view similar to that of FIG. 6, but showing components of the invention in different relative positions.
Figure 8:
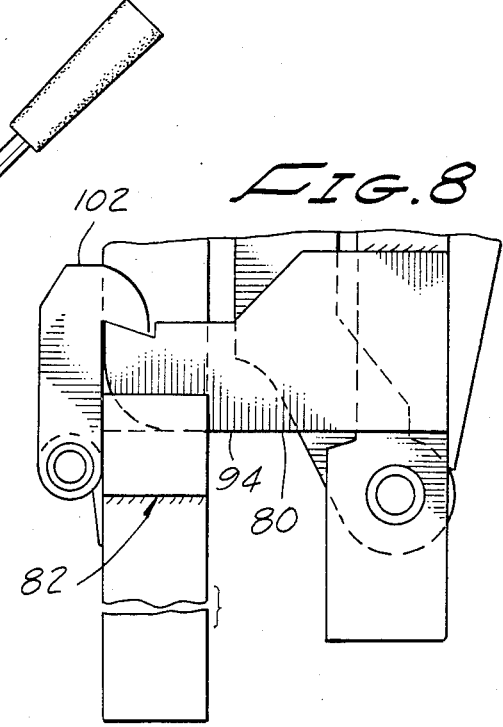
FIG. 8 is a fragmentary elevational view of the area 8—8 of FIG. 1, but showing the stop element and hook in fully engaged positions.

Before explaining the invention in detail, it is to be understood that the invention is not limited in its application to the details of the construction and the specific arrangement of the components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

Referring to FIG. 1, the rectangular tailgate opening frame 10 of a body 12 of a truck is shown as fitted with a rail type lift gate indicated generally by the numeral 14. In some respects the lift gate 14 is a schematically represented embodiment of the self-folding platform lift disclosed in U.S. Pat. No. Re. 31,157, the disclosure of which is incorporated herein by this reference.

Briefly, the illustrated lift comprises a frame having an opposite pair of vertically upstanding members 16, which may comprise box beam members, secured to the corner posts of the tailgate opening frame 10 of the van body. The pair of frame members 16 are rigidly interconnected at their lower ends by a box-like cross frame 18 having an upper face 20 comprising a truck bed extension plate flush with the floor 22 of the van body. Rigidly secured to the rear face of frames 16 are elongate vertically extending lift guide channels 24 which may be of essentially C-shaped cross-sectional configuration. The rear face of each guide is formed with a rearwardly opening full length vertically extending central slot 26. The lower ends of the pair of hollow guide members 24 terminate in a common horizontal plane, spaced vertically downwardly beneath the horizontal plane of the floor 22 of the van body. Lower end portions of the guides 24 are rigidly tied together by a cross brace 30.

A left side runner assembly 30 and a right or curb side assembly 32 are mounted on the left and right guide columns 24 respectively. Each of the runner assemblies is vertically elongate in configuration and on its forward face is fitted with a means, schematically indicated at 34 in FIG. 3, extending through the slot 26 of the corresponding guide column 24 by means of which the runner assembly is adapted for reciprocation vertically along its companion guide column. An appropriate means 34 is disclosed in the aforementioned U.S. Pat. No. Re. 31,157. While not illustrated, it should be understood that the pair of runner assemblies 30, 32 are connected to a source of power to effect raising and lowering of the pair of runner assemblies in unison. Such means may take the form of a pulley and cable system with a power source housed in the transverse box frame 18 and having the cables reeved through the pair of frame members 16 and hollow guide members 26, with the pair of cable ends secured to upper ends of the pair of runner assemblies 30, 32. This and a variety of other platform power mechanisms are well-known in the art.

The load platform of the present invention is substantially the same in construction and mode of operation as that disclosed in U.S. Pat. No. Re. 31,157, except in the respects to be pointed out presently. Briefly, the complete platform comprises an inner or forward platform section 40 and an outer or rear platform section 42, both of essentially rectangular planform. Each of the platform sections is of a typical construction comprising of a sheet metal skin over a rigid framework but, in the case of the forward platform section 40, the opposite side frame members 36 preferably are lengths of square section tubing having a face substantially flush with the platform skin. At their lower ends, the pair of runner assemblies 30, 32 carry coaxially aligned hinge means 44 interconnected to the forward edge of the inner or forward platform section 40. A rear edge 46 of the forward platform section 40 and a forward edge 48 of the rear platform section 42 are hingedly interconnected by means by a hinge means 50. The confronting edges 46 and 48 of the two platform sections define a butt joint upwardly offset relative to the axis of the hinge means 50. Accordingly, when the platform sections are in the horizontal position they are essentially a single horizontally rigid platform. The outer platform section 42 may include a tapered ramp section 52 defining the rearmost edge portion of the platform.

In the manner of U.S. Pat. No. Re. 31,157, opposite sides of the lift are each fitted with a length of a flexible element 54, such as a chain connected at its forward end to the upper end of the corresponding runner assembly 30 or 32 and at its rear end to a rear portion of the rear platform section 42. As described in this patent the pair of chains coact with companion roller pins 56 mounted in rigid rearward extensions 58 of the opposites sides of the forward platform section 40 to effect folding and unfolding of the two platform sections. Thus, the two platform sections can be moved or rotated between the horizontal load bearing condition illustrated in FIG. 1 and the collapsed fully folded condition illustrated in FIG. 2 wherein the underside of the outer platform section 42 closely overlies or abuts the underside of the inner platform section 40.

As part of the means of rotating the platform sections between collapsed and open conditions, the forward platform section 40, along its forward edge and at each of the opposite sides thereof, is fitted with a parallel pair of plates 62 that project forwardly beyond the forward edge of the platform section. As seen in FIG. 2 the plates 62 project forwardly beyond the hinge means 44 and, in the case of the curb side of the platform section, include an integral lobe 64 that protrudes beyond the plane of the upper surface of the forward platform section 40. On the curb side of the platform section the pair of plates 62 comprise a crank arm extension, relative to the pivot axis 44, for the forward platform section by means of which both platform sections can be rotated.

A power means for effecting rotation of the platform sections may be provided in the form of a hydraulic power cylinder 66 fitted within the curb side runner assembly 32. The power cylinder 66 is positioned substantially vertically with its closed butt end pivotally connected as at 68 between opposite side walls of the runner assembly 32. The cylinder 66 includes a downwardly projecting piston rod 70 whose outer end is pivotally connected at 72 to the lobe area 64 of the pair of plates 62. As indicated in the drawings, the cylinder pivot axes 68, 72 are parallel to the platform hinge axis 44. As will be apparent, as the cylinder rod pivot 72 is in spaced relation relative to the platform hinge axis 44 reciprocation of the cylinder rod 70 will effect rotation of the forward platform section 40 through 90 degrees with consequent corresponding rotation of the outer platform section 42 through essentially the same arc. A single acting cylinder 66 may be employed oriented in the manner shown in FIG. 2 such that when the platform sections 40 and 42 are in the folded condition, the cylinder rod 70 is in a condition of maximum extension. With this arrangement the piston 74 of the cylinder 66 has the full area of the rodless side of the piston exposed to the fluid pressure within the cylinder to hold the platform in the folded condition.

Each of the opposite sides of the forward platform section 40 is rigidly fitted with a stopper means 80 that extends upwardly beyond the upper surface of the platform section. Each of the stopper members 80 is positioned rearwardly adjacent to the platform pivot axis 44 and on the opposite side from the pivotal connection at 72 of the cylinder rod 70 to the crank arm extension plate 62. Each of the guide columns 24 is fitted with a saddle or stirrup 82 in coplanar alignment with one of the stoppers 80. As is indicated in FIG. 2, each stirrup 82 is located within the lower portion of its companion guide column 24 at a distance from the upper surface of the bed 22 of the vehicle which is proportionally related to the depth of the platform sections 40 and 42 such that when the platform sections are in the collapsed condition shown, the closed butt edges 46, 48 of the two platform sections are substantially coplanar with the upper surface of the bed 22 and bed plate 20.

Each stirrup 82 comprises a rigid assembly of a spacer block 86, support block 88 and a side guard plate 90 comprising a series of flat essentially rectangular plates secured, as by welding, to the outside face of the corresponding guide column 24. The upper faces of the spacer 86 and support block 88 occupy a common horizontal plane or seat 92 spaced beneath the plane of the upper surface of the bed 22 of the truck body the proportional distance previously stated. The side guard plate 90 extends above the surface 92 so that the stirrup 82 defines an essentially U-shaped rearwardly and upwardly open structure in combination with the outside face of the guide column 24 within which the corresponding stopper 80 can be rotated. Stopper 80 has a straight edge 94 along its side adjacent to the platform hinge 44 adapted for flush engagement with surface 92 when the parts occupy the relative positions illustrated in FIG. 2. As will be apparent, the stirrup 82 provides a stop limiting downward movement of the two platform sections 40 and 42 when they are in the collapsed condition of FIG. 2.

At the level of the pair of stirrups 82 on the forward face of the pair of guide columns 24, each of the guide columns mounts a horizontally disposed bushing 98 for rotably mounting opposite ends of an operating shaft 100. Each of the opposite ends of the shaft 100 has the root end of a latch means in the form of a hook 102 keyed thereto. The curb side hook 102 is fitted with an upstanding actuating handle 104 by means of which the pair of hooks are both actuated from a single side of the lift. The pivot axis of the actuating shaft 100 is located beneath the level of the surface 92 whereby the forward face of each stirrup 82 provides a stop limiting counter-clockwise rotation of each hook 102. The pair of hooks 102 are normally biased into the solid outline positions shown in FIG. 2 by means of a torque spring 106 wrapped around the operating shaft 100 at a location adjacent to the left side guide column 24 in the manner shown in FIG. 10. One end of the spring 106 is biased against a block 108 affixed to the left side guide column 24 while the other end of the spring is biased against a stud 110 secured to the surface of the operating shaft 100.

A safety lock 112 for maintaining the platform sections 40 and 42 in a collapsed condition preferably takes the form of a length of flexible wire rope arranged in a figure eight configuration to define a pair of opposite end loops. One of the loops is rotatably pinned as at 114 to the outside of the curb side runner assembly 32, from which it gravitationally depends when not in use. The curb side of the outer platform section is rigidly fitted with a sidewardly projecting stud 118, whose outer end carries a side guard cap 120 over which the outer end loop of the hook can be manually placed and removed.

Throughout their length and width, the butt joint edges 46 and 48 of the platform sections 40 and 42 ar covered or closed to define continuous planar surfaces which come into faying contact when the platforms are in the unfolded condition of FIG. 1. Thus, when the platform sections 40 and 42 are in the fully folded and transit position as in FIG. 2, the butt joint edges 46, 48 define a continuous planar surface that is flush with the upper surface of bed of the truck and with the upper surface 20 of the box beam structure 18. At the same time only a minimal gap, if any, is present between the rear edge of the upper bed plate surface 20 of the box beam 18 and the forward edge of the continuous surface 46, 48. Accordingly, the vehicle on which the lift gate 14 is mounted can be backed directly into contact with a loading dock so that wheeled pallet jacks or fork lifts can be moved directly from the dock and across the surfaces 46, 48 and onto surfaces 20, 22 without a dock plate. In this connection, it will observed that loads imposed on the butt joint surfaces 46, 48 are absorbed by the stirrups 82 in which the stoppers 80 are now seated.

The distal ends of the stopper 80 and hook 102 are formed with complementary teeth 124 and 126, respectively, which when fully engaged as in FIG. 2 come into mutual contact throughout their bearing surfaces with the point of each tooth lodged within a shoulder within the root of the opposite tooth. The angle of the mutually engaged teeth 124, 126 relative to the horizontal is such that unfolding movement of the platform sections 40, 42 cannot occur short of destructive shearing of the teeth. Thus, if the operator of the vehicle should neglect to engage the safety lock 112 inadvertent unfolding of the platform sections cannot occur even assuming that all fluid pressure has been lost within the cylinder 66 behind the rodless face of the piston 74.

When it is desired to put the lift 14 into use the operator need merely move the handle 104 for the locks or hooks 102 into the phantom outline position of FIG. 2 and, thereafter, operate the controls for the cylinder 66 in a mode to relieve fluid pressure from behind the rodless face of the piston 74 or, in the case of a double-acting cylinder, admit fluid pressure to the rod 70 side of the piston 74. The two platform sections 40 and 42 then unfold to the fully horizontal condition depicted in FIG. 1 without the necessity of any vertical movement of the pair of runner assemblies 30, 32. However, as will be appreciated by those of ordinary skill in the art, the controls for the power system for the runner assemblies 30, 32 may simultaneously be actuated either in a mode to raise or lower them. The operator thus has a choice of unfolding the platform sections and then raising or lowering them or, alternatively, unfolding the platform sections and simultaneously either raising or lowering them to truck bed height or ground level, respectively.

When it is desired to return the horizontally extended load platform to transit position, assuming the platform to be above the level of the stirrups 82, controls for the cylinder 66 are operated in a mode to admit fluid pressure behind the rodless face of the piston 74 in order to extend the piston rod 70. Assuming that the folding occurred at an elevation of the platform as depicted in FIG. 6, wherein the edge 94 of stopper 80 is spaced above the surface 92 of the stirrup 82, the collapsed platforms can now be lowered into position on the stirrups 82 by operating the controls for the power means of the runners 30, 32 in a down mode. The distal ends of the stopper 80 and hook 102 on their edges opposite to the teeth 124, 126 are formed with complementary cam surfaces 128 and 130, respectively, such that the hook 102 is cammed out of interfering alignment as the platforms and the stoppers 80 descend into stirrups 82. While not illustrated in the drawings, it will be apparent from inspection of the cam profiles 128, 130 that the camming action will occur even in a condition where the horizontally extended platform sections 40, 42 are at precisely the correct location for proper seating of the stoppers 80 in the stirrups 82 without any downward movement of the fully collapsed platforms, i.e., when a distance from stirrup surface 92 to platform axis 44 is substantially equal to the distance from the distal end of stopper edge 94 to axis 44.

While the invention appears to have its greatest utility when embodied in a rail-type lift gate having a two piece platform, it will be apparent to those of ordinary skill in the art that it may also be employed with one-piece platform lifts. Further, while it is preferred that the power means for effecting pivotal movement of the platform sections 40, 42 takes the form of the power cylinder 66, the invention may also be embodied in a lift gate such as that shown in U.S. Pat. No. Re. 31,157 in which folding and unfolding of the platform sections is a function of vertical movement of the runner assemblies. It will be understood that these and other modifications are possible without departing from the invention.

I claim:

1. In a stowable lift, the combination comprising:
    a support means;
    a runner means mounted on said support means for vertical movement therealong;
    a platform having a forward edge pivotally connected to said runner means on a horizontal pivot axis for movement between horizontal and vertical positions of said platform;
    a rigid stopper means having a proximal end rigidly secured to one side of said platform at a location spaced rearwardly from said platform axis,
    said stopper means having a distal end that projects beyond the plane of said platform in a direction so that when said platform is in said vertical position said distal end of said stopper means projects forwardly towards said support means, and
    a stirrup means rigidly affixed to said support means within the range of vertical reciprocation of said runner means relative to said support means so that said distal end of said stopper means and said stirrup means are in coplanar interfering alignment when said platform is disposed in said vertical position,
    said stirrup means having shape characteristics defining a seat having an entrance onto said seat for said stopper means that is both upwardly and rearwardly open,
    whereby, when said pivot axis of said platform is at substantially the elevation of said stirrup means with said stirrup means and said distal end of said stopper means spaced approximately at the same radial distance from said pivot axis of said platform, said stopper means can be swung into and out of seating contact with said stirrup means by pivotal movement of said platform between said horizontal and vertical positions thereof.

2. A lift as in claim 1 in which:
    a powered means is operatively interconnected between said platform and said runner means for effecting movement of said platform between horizontal and vertical positions.

3. A lift as in claim 2 in which:
    said platform has an integral crank arm extending forwardly relative to said axis of said platform to which said power means is operatively interconnected.

4. A lift as in claim 1 in which:
    said support means mounts a latch means adjacent to said stirrup means that is movable into and out of latching engagement with one side of said stopper means when said platform is in said vertical position and said stopper means is seated on said stirrup means.

5. A lift as in claim 4 in which:
    said latch means is operatively interconnected to a means for normally biasing said latch means into a position for latching engagement with said stopper means,
    said stopper means and said latch means having cooperating surfaces for displacing said latch means out of said position of latching engagement (1) when said platform is in vertical position and is lowered to bring said stopper means into contact with said stirrup means and (2) when said stirrup means is spaced approximately the same radial distance from said pivot axis of said platform as the distance from said pivot axis to said distal end of said stopper means and said platform is turned from horizontal to vertical position.

6. A lift as in claim 1 in which:
    said platform comprises an inner platform section;

said lift further comprising an outer platform section having a forward edge connected to a rear edge of said inner platform section by a horizontal hinge means positioned for folding an underside of said outer platform section into superposition over an underside of said inner platform section;

said lift having a means operatively interconnected between said runner means and said outer platform section for translating folding or unfolding movement of the said inner platform section into corresponding folding or unfolding movement of said outer platform section.

7. A lift as in claim 6 in which:

a powered means is operatively interconnected between said platform and said runner means for effecting movement of said inner platform section between vertical and horizontal positions.

8. A stowable lift comprising:

a framework having a laterally spaced-apart pair of vertically extending guides that are interconnected by a horizontally extending bed plate spaced from opposite ends of said pair of guides;

a pair of runner assemblies operatively interconnected to said pair of guides for vertical reciprocation therealong;

a platform having a forward edge pivotally connected at opposite sides of said platform to said pair of runner assemblies on a horizontal pivot axis for movement between horizontal and vertical positions of said platform, said platform having a closed rear edge whereby when said platform is in a vertical and stowed position said rear edge defines a flush horizontal continuation of said bed plate;

a rigid stopper means having a proximal end rigidly secured to one side of said platform at a location spaced rearwardly from said platform pivot axis, said stopper means having a distal end that projects beyond the plane of said platform in a direction so that when said platform is in said vertical position, said distal end of said stopper means projects forwardly towards one of said guides; and a stirrup means rigidly affixed to said one guide within the range of vertical reciprocation of said runner means relative to said guides so that said distal end of said support means and said stirrup means are in coplanar interfering alignment when said platform is disposed in said vertical position, said stirrup means having shape characteristics defining a seat having an entrance to said seat for said stopper means that is both upwardly and rearwardly open, whereby, when said pivot axis of said platform is at substantially the elevation of said stirrup means, with said stirrup means and said distal end of said stopper means spaced approximately the same radial distance from said pivot axis of said platform, said stopper means can be swung into and out of seating contact with said stirrup means by pivotal movement of said platform between said horizontal and vertical positions thereof, said stirrup means and said bed plate being vertically spaced apart a distance such that when said platform is in said vertical and stowed position said closed rear edge defines a flush horizontal continuation of said bed plate.

9. A lift as in claim 8 in which:

said platform comprises an inner platform section;

said lift further comprising an outer platform section having a closed forward edge connected to said closed rear edge of said inner platform section by a horizontal hinge means positioned for folding an underside of said outer platform section into superposition over an underside of said inner platform section;

said lift having a means operatively interconnected between said runner means and said outer platform section for translating folding or unfolding movement of said inner platform section into corresponding folding or unfolding movement of said outer platform section;

said closed rear edge of said inner platform section and said closed forward edge of said outer platform section together defining a flush horizontal continuation of said bed plate when said two platform sections are in a vertical and stowed position.

10. A lift as in claim 9 in which:

a powered means is operatively interconnected between said inner platform section and said runner means for effecting movement of said platform sections between horizontal and vertical positions.

11. A lift as in claim 10 in which:

said inner platform section has an integral crank arm extending forwardly relative to said axis of said inner platform section to which said powered means is operatively interconnected.

12. A lift as in claim 11 in which:

said one guide mounts a latch means adjacent to said stirrup means that is movable into and out of latching engagement with one side of said stopper means when said platform is in said vertical position and said stopper means is seated on said stirrup means.

13. A lift as in claim 12 in which:

said latch means is operatively interconnected to a means for normally biasing said latch means into a position for latching engagement with said stopper means, said stopper means and said latch means having cooperating surfaces for displacing said latch means out of said position of latching engagement (1) when said inner platform section is in vertical position and is lowered to bring said stopper means into contact with said stirrup means and (2) when said stirrup means is spaced approximately the same radial distance from said pivot axis of said inner platform section as the distance from said pivot axis to said distal end of said stopper means and said inner platform section is turned from horizontal to vertical position.

* * * * *